(12) United States Patent
Nakamura et al.

(10) Patent No.: US 9,809,110 B2
(45) Date of Patent: Nov. 7, 2017

(54) SADDLE-RIDING TYPE VEHICLE

(71) Applicant: Yamaha Hatsudoki Kabushiki Kaisha, Iwata-shi, Shizuoka (JP)

(72) Inventors: Shinichirou Nakamura, Shizuoka (JP); Fumihiro Hidaka, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 528 days.

(21) Appl. No.: 14/585,379

(22) Filed: Dec. 30, 2014

(65) Prior Publication Data

US 2016/0185211 A1  Jun. 30, 2016

(51) Int. Cl.
| | | |
|---|---|---|
| *B60K 15/035* | (2006.01) | |
| *F02M 25/08* | (2006.01) | |
| *F02B 61/02* | (2006.01) | |
| *B60K 15/063* | (2006.01) | |
| *B60K 15/03* | (2006.01) | |

(52) U.S. Cl.
CPC .. *B60K 15/03519* (2013.01); *B60K 15/03504* (2013.01); *F02B 61/02* (2013.01); *F02M 25/08* (2013.01); *F02M 25/089* (2013.01); *B60K 2015/03388* (2013.01); *B60K 2015/0632* (2013.01); *B60Y 2200/124* (2013.01)

(58) Field of Classification Search
CPC . F02M 25/089; F02M 25/08; B60K 15/03519
See application file for complete search history.

(56) References Cited

U.S. PATENT DOCUMENTS

| | | | | |
|---|---|---|---|---|
| 4,815,436 A | * | 3/1989 | Sasaki | B60K 15/03504 123/520 |
| 9,180,776 B2 | * | 11/2015 | Spitz | B60K 15/06 |
| 2002/0112907 A1 | | 8/2002 | Maeda et al. | |
| 2009/0194077 A1 | * | 8/2009 | Marushima | B01D 46/0036 123/519 |
| 2009/0229691 A1 | * | 9/2009 | Miura | B60K 15/03519 137/625 |
| 2010/0224172 A1 | | 9/2010 | Kusa | |
| 2010/0242924 A1 | * | 9/2010 | Ochi | F02M 25/089 123/519 |
| 2011/0239994 A1 | | 10/2011 | Hirukawa | |
| 2012/0240905 A1 | * | 9/2012 | Kondo | B62J 37/00 123/519 |
| 2012/0247862 A1 | * | 10/2012 | Nishimura | B62K 11/04 180/299 |

FOREIGN PATENT DOCUMENTS

| | | | |
|---|---|---|---|
| JP | 2002-225576 A | 8/2002 | |
| JP | 2010-203313 A | 9/2010 | |
| JP | CA 2696112 A1 * | 9/2010 | ......... F02M 25/0854 |
| JP | 2011-214503 A | 10/2011 | |

* cited by examiner

*Primary Examiner* — Joseph Rocca
*Assistant Examiner* — Daniel Yeagley
(74) *Attorney, Agent, or Firm* — Keating and Bennett, LLP

(57) ABSTRACT

A saddle-riding type vehicle includes a seat, a fuel tank including a vent and disposed below the seat, a canister connected to the vent, and an overflow prevention valve provided in a fuel vapor passage connecting the vent and the canister. The overflow prevention valve is positioned higher than the vent.

19 Claims, 7 Drawing Sheets

SADDLE-RIDING TYPE VEHICLE

BACKGROUND OF THE INVENTION

1. Field of the Invention

The present invention relates to a saddle-riding type vehicle.

2. Description of the Related Art

A fuel tank of a vehicle that is driven by volatile liquid fuel such as gasoline or the like may include a vent to decrease the internal pressure of the fuel tank.

For example, JP 2002-225576 A discloses an off-road vehicle including a fuel tank having two vents (the vents are referred to as a breather opening in JP 2002-225576 A). Two breather hoses connected to the respective two vents are connected to a hose (the hose is referred as a joint hose in JP 2002-225576 A). The joint hose communicates with the atmosphere (air) via a check valve.

JP 2011-214503 A and JP 2010-203313 A also disclose an off-road vehicle in which a fuel tank is connected via a pipe to a canister to temporarily capture fuel vapor from the fuel tank.

SUMMARY OF THE INVENTION

While a vehicle is running, the height of the surface of the liquid fuel in the fuel tank may sometimes vary largely due to a change in posture of the vehicle body. In order to prevent leakage of liquid fuel from the vent due to the variation in height of the liquid surface, it is effective to provide an overflow prevention valve, such as a rollover valve or the like, to a breather pipe connected to the vent. Meanwhile, in order to reduce discharge of fuel vapor from the vent into the air, a canister is used. However, the overflow prevention valve and the canister have not been appropriately arranged in a saddle-riding type vehicle.

A saddle-riding type vehicle according to a preferred embodiment of the present invention includes a seat; a steering handle disposed forward of the seat; a fuel tank including a vent configured to discharge fuel vapor, the fuel tank being arranged such that at least a portion of the fuel tank is located below the seat; a canister connected to the vent of the fuel tank and configured to capture the fuel vapor; and an overflow prevention valve provided in a fuel vapor passage that connects the vent and the canister, the overflow prevention valve being configured to prevent liquid fuel from flowing from the fuel tank to the canister, and the overflow prevention valve being positioned higher than the vent of the fuel tank.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
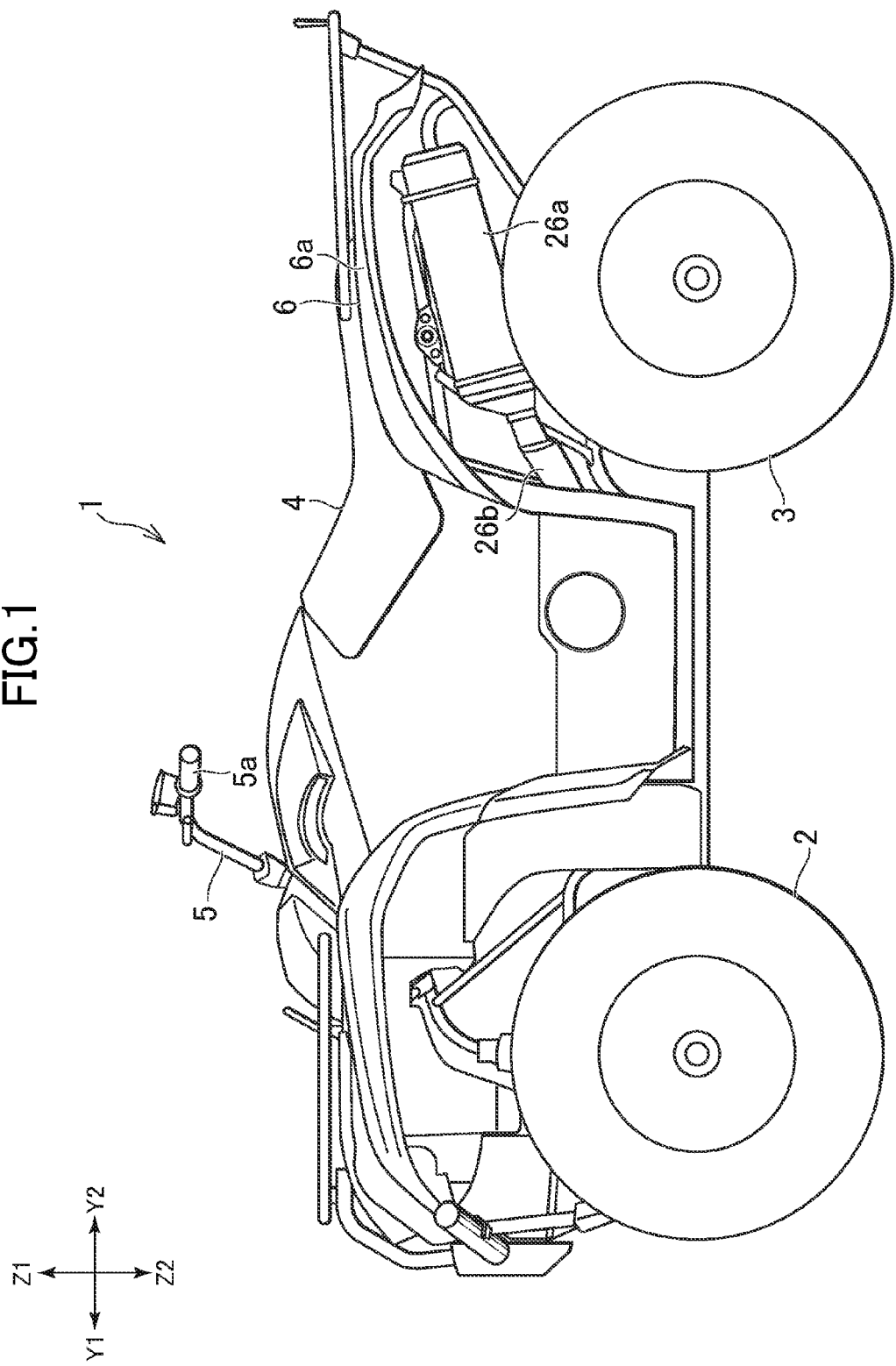
FIG. 1 is a side view of a saddle-riding type vehicle according to a preferred embodiment of the present invention.
Figure 2:
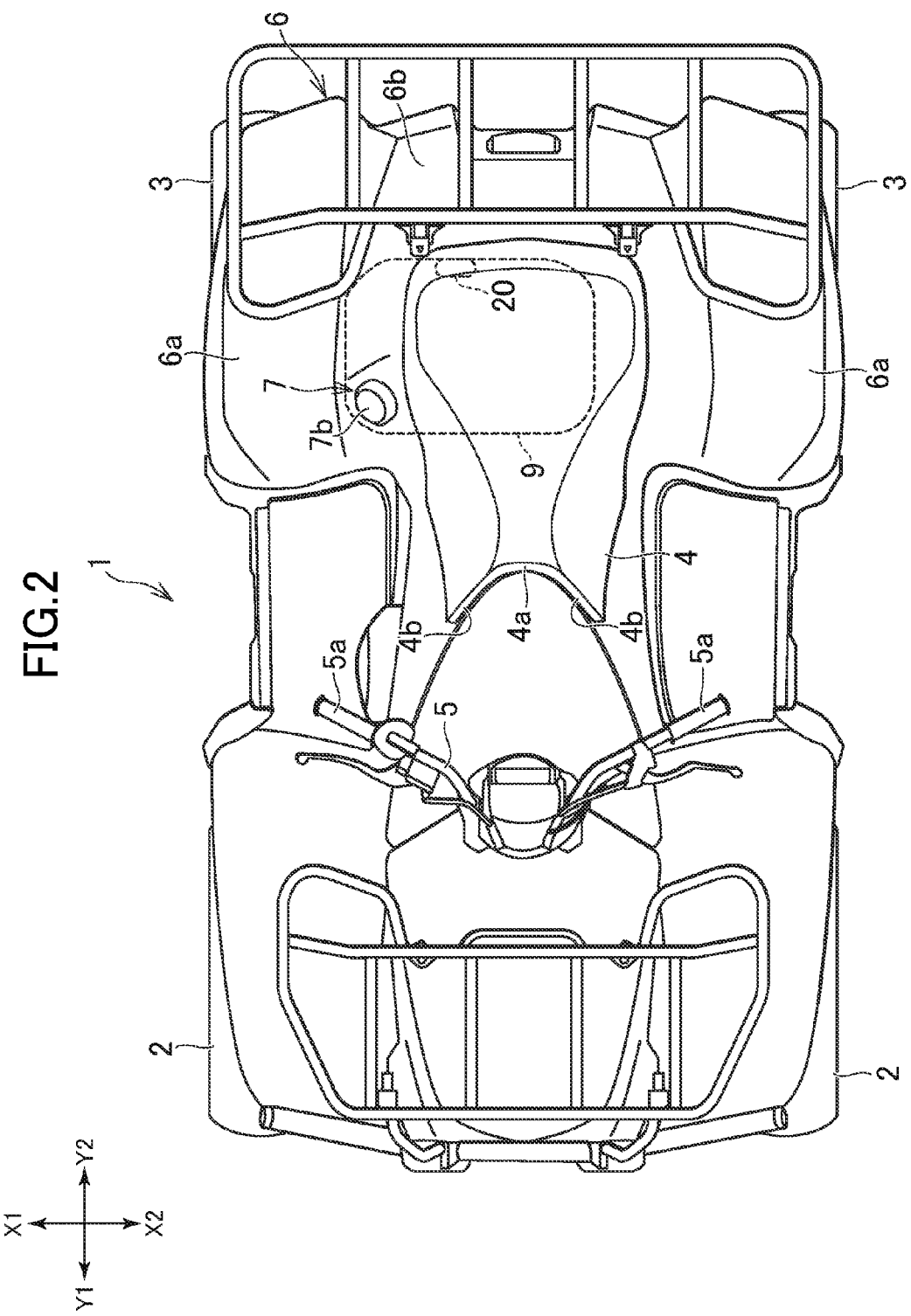
FIG. 2 is a plan view of the saddle-riding type vehicle.
Figure 3:
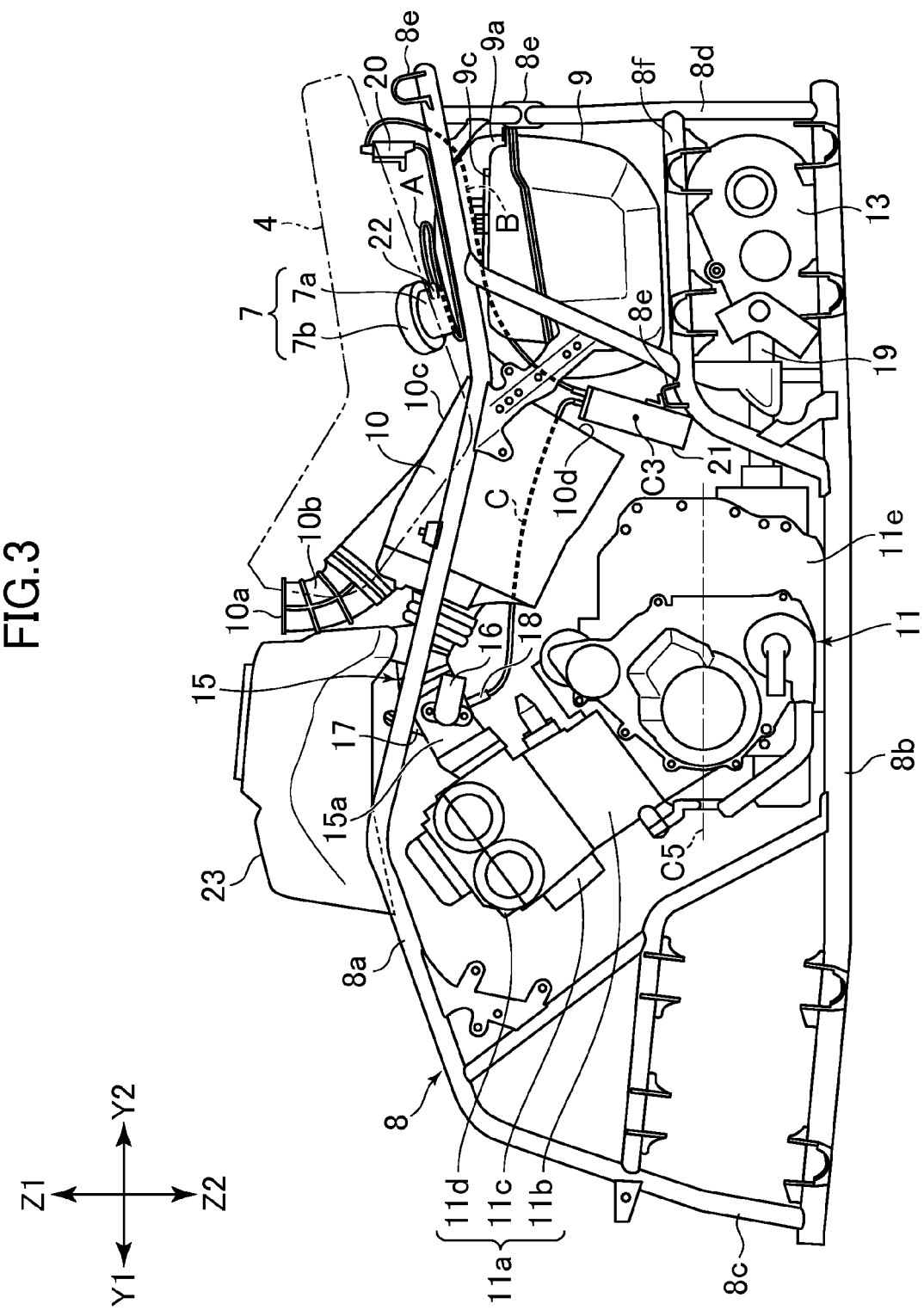
FIG. 3 is a side view showing a positional relationship between a fuel tank, an overflow prevention valve, a canister, and the like provided on the saddle-riding type vehicle.
Figure 4:
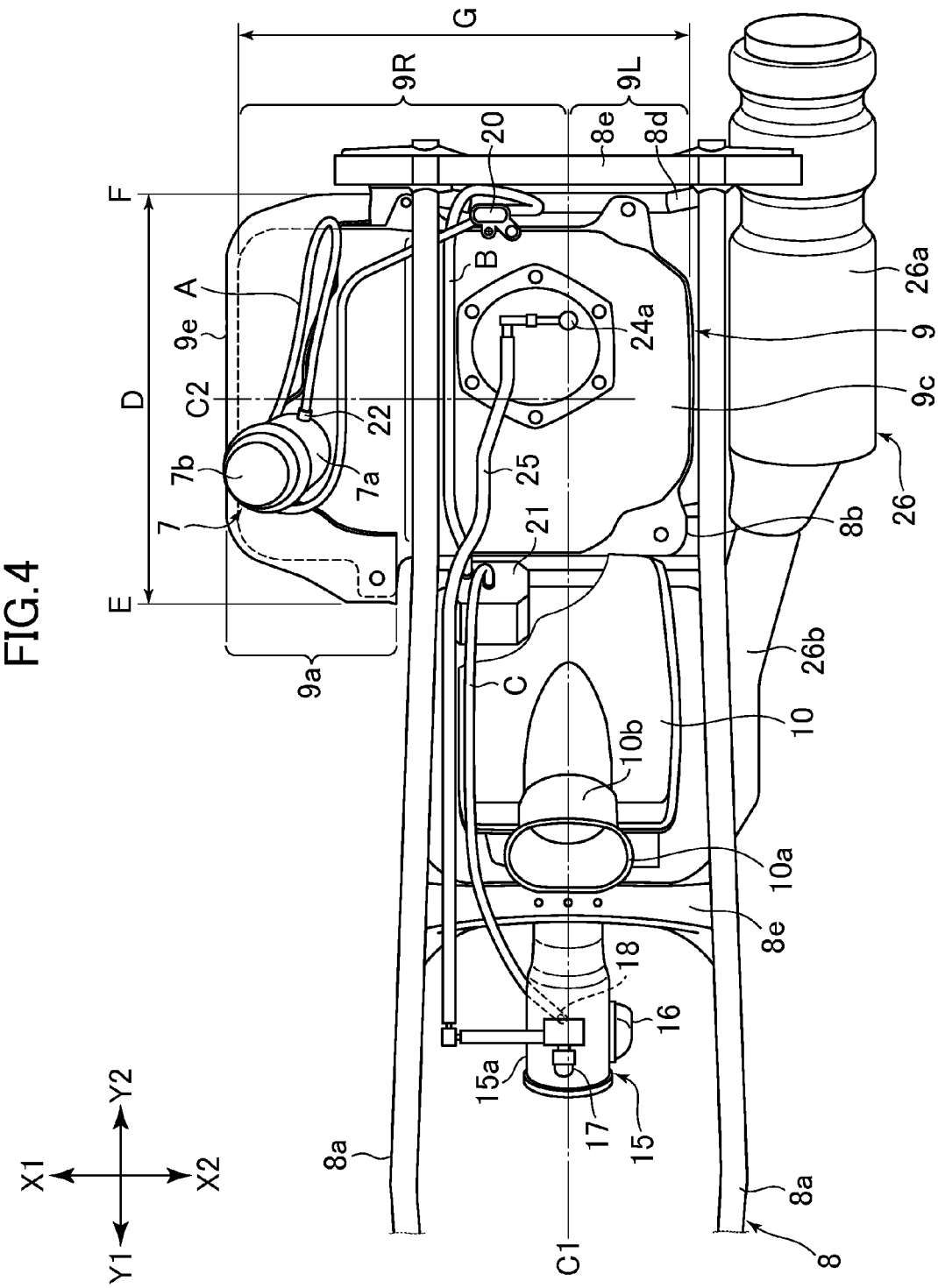
FIG. 4 is a plan view showing a positional relationship between the fuel tank, the overflow prevention valve, the canister, and the like shown in FIG. 3.
Figure 5:
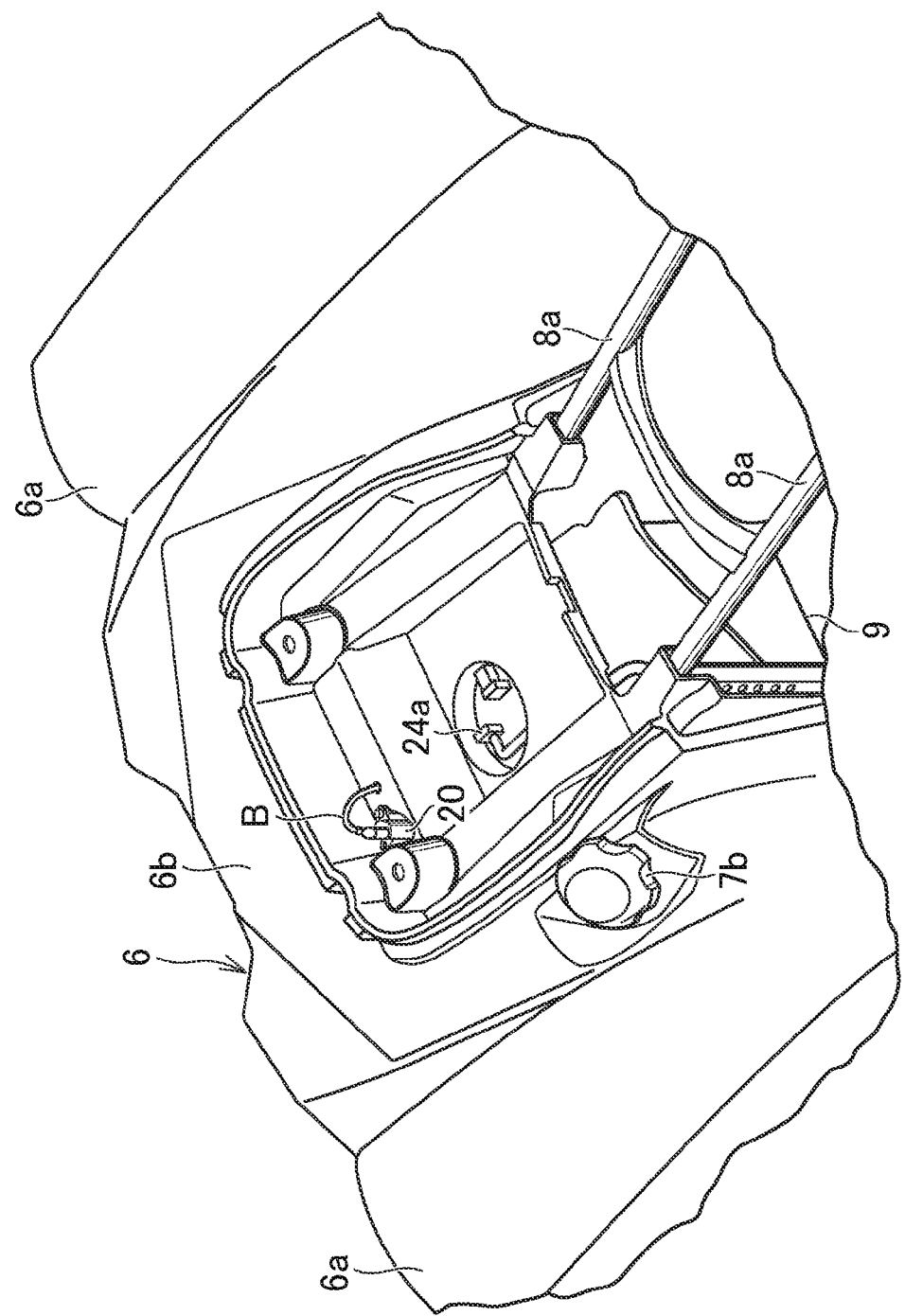
FIG. 5 is a perspective view showing an attachment structure of the overflow prevention valve.

Preferred embodiments of the present invention will be described with reference to the drawings. FIG. 1 is a side view of a saddle-riding type vehicle 1 according to a preferred embodiment of the present invention. FIG. 2 is a plan view of the saddle-riding type vehicle 1. FIG. 3 is a side view showing a positional relationship between a fuel tank 9, an overflow prevention valve 20, a canister 21, and the like provided on the saddle-riding type vehicle 1. FIG. 4 is a plan view showing a positional relationship between the fuel tank 9, the overflow prevention valve 20, the canister 21, and the like shown in FIG. 3. In FIG. 4, an air cleaner 10 is shown partially broken so that the canister 21 is exposed. FIG. 5 is a perspective view showing an attachment structure of the overflow prevention valve 20.

In FIGS. 1, Y1 and Y2 indicate the respective forward (the advancing direction of the vehicle) and rearward directions of a vehicle body, and Z1 and Z2 indicate the respective upward and downward directions of the vehicle body. In FIGS. 2, X1 and X2 indicate the respective rightward and leftward directions of the vehicle body, in which the direction indicated by X1-X2 corresponds to the vehicle width direction.

The vehicle 1 is preferably a saddle-riding type four wheel vehicle (for example, an all-terrain vehicle), and includes left and right front wheels 2 and left and right rear wheels 3. The saddle-riding type vehicle according to other preferred embodiments of the present invention may be a motorcycle (including a scooter type), a three-wheeled all-terrain vehicle, and a snowmobile, for example.

As shown in FIGS. 1 and 2, the vehicle 1 includes a steering handle 5 disposed forward of a seat 4. The handle 5 is connected to the left and right front wheels 2 via a steering shaft (not shown) and a tie-rod (not shown). A grip 5a is provided on each of the right and left sides of the handle 5. The handle 5 preferably has a bar shape, for example. In this specification, a bar-shaped handle refers not only to a handle of a type that extends straight or substantially straight from the right grip 5a to the left grip 5a, but also one of a type in which a bar provided with the left grip 5a and a bar provided with right grip 5a is separated. The left and right front wheels 2 are positioned on the respective left and right sides in the front portion of the vehicle frame 8 (see FIG. 3), and supported by the vehicle frame 8 via arms so as to move up and down.

As shown in FIG. 3, an engine 11 is disposed in a lower portion of the vehicle body. The engine 11 includes a cylinder portion 11a. The cylinder portion 11a includes a cylinder block 11b and a cylinder head 11c. The cylinder block 11b includes a cylinder inside thereof. The cylinder head 11c includes an intake passage and an exhaust passage connected to the cylinder, and is disposed on an upper side of the cylinder block 11b. The cylinder portion 11a further includes a cylinder head cover 11d disposed on the upper side of the cylinder head 11c. The cylinder portion 11a extends upward from a front portion of a case 11e. The cylinder portion 11a is preferably inclined forward as shown in FIG. 3. The engine 11 is disposed such that the cylinder portion 11a is positioned farther forward than the seat 4. The engine 11 includes, in the rear and lower portion of the engine 11, a case 11e that stores a clutch, a transmission, and the like.

A driving force of the engine 11 is transmitted to the left and right rear wheels 3 via the transmission stored in the case 11e and a deceleration device 13. As shown in FIG. 3, the deceleration device 13 is disposed in a position spaced rearward from the case 11e and below the fuel tank 9. As an example, the deceleration device 13 and the transmission are connected to each other via a drive shaft 19. The deceleration device 13 and the transmission may be connected to each other via a driving force transmitting member, such as a chain or a belt, instead of the drive shaft 19. The deceleration device 13 is positioned between the left and right rear wheels 3 and is connected to the respective left and right rear wheels 3 via an axle (not shown) extending leftward and rightward from the deceleration device 13. An example of the deceleration device 13 is a mechanism (for example, a bevel gear) configured to convert the direction in which the driving force is transmitted from the front-back direction to the left-right direction. The deceleration device 13 may include a differential device. The left and right rear wheels 3 are disposed on the respective left and right sides in the rear portion of the vehicle body frame 8, and supported by the vehicle frame 8 so as to move up and down. The left and right rear wheels 3 are covered by respective fender portions 6a of the exterior cover 6.

As shown in FIG. 3, the vehicle body frame 8 includes left and right lower frame portions 8b disposed in the lower portion of the vehicle body and that extend in the front-back direction. The vehicle body frame 8 further includes left and right upper frame portions 8a disposed in the upper portion of the vehicle body and that extend in the front-back direction. The vehicle body frame 8 still further includes a front frame portion 8c extending upward from the front end portion of the lower frame portion 8b toward the upper frame portion 8a, and a rear frame portion 8d extending upward from the rear end portion of the lower frame portion 8b toward the upper frame portion 8a. The vehicle body frame 8 yet further includes a plurality of cross members 8e extending between the frame portions 8a, 8b, 8c, 8d on the right side and the frame portions on the left side. The structure of the vehicle frame 8, however, is not limited to the above described preferred embodiment, and may be changed discretionally.

As shown in FIG. 1, the vehicle 1 includes a seat 4 on which a rider sits straddling the vehicle 1. The seat 4 is disposed on and supported by the left and right upper frame portions 8a. As shown in FIG. 2, the seat 4 includes a seat upper portion 4a defining an upper surface of the seat 4, and seat lateral portions 4b suspended from the respective left and right sides of the seat upper portion 4a. The seat upper portion 4a is configured such that the front portion of the seat upper portion 4a has a width (the width in the left-right direction) smaller than that of a rear portion of the seat.

As shown in FIG. 3, the fuel tank 9 is disposed below the seat 4 and located between the left and right rear wheels 3. In this specification, "the fuel tank 9 is disposed below the seat 4" includes an arrangement in which the entire fuel tank 9 overlaps the seat 4 in a plan view of the vehicle body, and an arrangement in which the fuel tank 9 partially overlaps the seat 4. "The fuel tank 9 is disposed below the seat 4" includes not only an arrangement in which the entire fuel tank 9 is positioned lower than the lower edge of the seat lateral portion 4b but also an arrangement in which the upper portion of the fuel tank 9 is positioned between the left and right seat lateral portions 4b.

As shown in FIG. 3, the fuel tank 9 is disposed, for example, below the rear portion of the seat 4. When a rider straddles the seat 4, the front portion of the seat 4 is positioned between the left and right legs of the rider. In an arrangement in which the fuel tank 9 is disposed below the rear portion of the seat 4, the fuel tank 9 is positioned farther rearward than the position of the legs of the rider. As a result, it is easy to enlarge the width of the fuel tank 9 in the left-right direction in order to ensure the capacity of the fuel tank 9. As an example, the width of the fuel tank 9 in the left-right direction is wider than that of the air cleaner 10 and a storage case 23, to be described below, which are disposed farther forward than the fuel tank 9. As shown in FIG. 2, the width in the left-right direction of the fuel tank 9 is preferably wider than that of the seat 4 (specifically, the rear portion of the seat 4). The layout of the fuel tank 9, however, is not limited to that shown in FIGS. 2 and 3. For example, the fuel tank 9 may be disposed below the middle portion of the seat 4 or below the front portion of the seat 4.

As shown in FIG. 4, the fuel tank 9 includes a portion 9R positioned on the right side of the center line C1 of the vehicle body and a portion 9L positioned on the left side of the center line C1 (the respective portions 9R and 9L will be hereinafter referred to as a tank right portion and a tank left portion). The center line C1 refers to a center line positioned along the center of the vehicle body in the left-right direction and extending in the front-back direction of the vehicle body. As an example of the fuel tank 9, as shown in FIG. 4, the width of the tank right portion 9R is preferably wider than that of the tank left portion 9L. The tank right portion 9R having a wider width than that of the tank left portion 9L makes it possible to ensure a space to mount a component on the outer side of the tank left portion 9L in the left-right direction of the vehicle body. For example, an exhaust system 26 connected to the engine 11 is located to the left of the fuel tank 9. Specifically, a muffler 26a is disposed to the left of the fuel tank 9. The exhaust system 26 includes an exhaust pipe 26b extending from the engine 11 in addition to the muffler 26a. Alternatively, the tank left portion 9L may have a wider width than the tank right portion 9R. In this case, the exhaust system or a member different from the exhaust system may be disposed to the right of the fuel tank 9.

As shown in FIG. 4, the tank right portion 9R includes a portion 9a protruding outward (that is, rightward) in the left-right direction of the vehicle body beyond the right upper frame portion 8a of the vehicle body frame 8 (this portion 9a will be hereinafter referred to as a protruding portion). The protruding portion 9a protrudes outward in the left-right direction of the vehicle body beyond the edge (the lower edge of the right seat lateral portion 4b) of the seat lateral portion 4b of the seat 4. Further, the protruding portion 9a extends farther upward than a portion of the fuel tank 9 positioned between the left and right upper frame portions 8a in a plan view of the vehicle body (a portion positioned below the seat 4). That is, the upper surface of the protruding portion 9a is positioned higher than the upper surface 9c of the portion positioned between the left and right upper frame portions 8a (see FIG. 3). With the above configuration, it is possible to increase the capacity of the fuel tank 9. The fuel tank 9 may include, on the tank left portion 9L, a portion protruding farther leftward than the left upper frame portion 8a. However, the fuel tank 9 may not necessarily include the protruding portion 9a.

The width of the fuel tank 9 in the left-right direction is wider than that of the seat 4. Thus, as shown in FIG. 2, the fuel tank 9 includes a portion not covered by the seat 4. In the present preferred embodiment, the fuel tank 9 includes the protruding portion 9a protruding outward in the left-right direction of the vehicle body beyond the edge (the lower edge of the right seat lateral portion 4b) of the seat lateral portion 4b. The fuel tank 9 includes a fuel supply port 7 on the portion not covered by the seat 4, that is, the protruding portion 9a. With the above configuration, a rider fills fuel into the fuel tank 9 without removing the seat 4. The fuel supply port 7 may include a cylindrical portion 7a extending upward from the fuel tank 9 and a cap 7b attached to the cylindrical portion 7a. The cylindrical portion 7a of the fuel supply port 7 extends upward from the upper surface of the protruding portion 9a. A vent 22 is provided on the cylindrical portion 7a of the fuel supply port 7 (see FIG. 4), as to be described below.

As shown in FIG. 2, the vehicle 1 includes the exterior cover 6 covering the rear portion of the vehicle body. The exterior cover 6 includes fender portions 6a covering the respective left and right rear wheels 3. The exterior cover 6 includes a cover middle portion 6b positioned between the left and right fender portions 6a and covering the fuel tank 9. The cover middle portion 6b includes an opening provided at a position corresponding to the fuel supply port 7. The cap 7b of the fuel supply port 7 is positioned on the upper side of the exterior cover 6. The position of the fuel supply port 7, however, is not necessarily limited to the above described preferred embodiment. For example, the fuel supply port 7 may be provided at a position covered by the seat 4. The seat 4 is disposed on the upper side of the cover middle portion 6b.

As shown in FIG. 3, the fuel tank 9 is disposed between the upper frame portions 8a and the arm support portions 8f supporting the rear wheels 3 via arms, and supported by the vehicle frame 8. The fuel tank 9 is fixed on, for example, stays (not shown) extending from the upper frame portions 8a or the arm support portions 8f. Alternatively, the fuel tank 9 may be fixed on the cross members 8e extending between the left and right rear frame portions 8d.

In the present preferred embodiment, as shown in FIG. 3, an air cleaner 10 configured to purify the air to be supplied to the engine 11 is disposed forward of the fuel tank 9 and below the front portion of the seat 4. The width of the air cleaner 10 in the left-right direction of the vehicle body is preferably smaller than that of the front portion of the seat 4 in a plan view. With the above configuration, a rider can comfortably straddle the seat 4. The front portion of the air cleaner 10 may be positioned farther forward than the seat 4. The entire air cleaner 10 may be positioned lower than the lower edge of the seat lateral portion 4b (see FIG. 2), or the upper portion of the air cleaner 10 may be positioned higher than the lower edge of the seat lateral portion 4b (that is, the upper portion of the air cleaner 10 may be positioned between the left and right seat lateral portions 4b). In an example, the air cleaner 10 includes an intake duct 10b. The intake duct 10b extends forward from the upper portion of the air cleaner 10 and is then bent upwards. The tip end of the intake duct 10b defines an intake port 10a. The structure of the air cleaner 10, however, is not limited to the above described preferred embodiment, and various modifications may be made.

As shown in FIG. 3, the air cleaner 10 is disposed behind the cylinder portion 11a in a side view of the vehicle body. The air cleaner 10 is connected to an intake port of the cylinder head 11c via an intake duct 15. The intake duct 15 includes a throttle body 15a in a portion thereof. The throttle body 15a includes a throttle valve to adjust the amount of air flowing from the air cleaner 10 into the cylinder portion 11a. As shown in FIG. 3, in an example of the throttle body 15a, an actuator 16 driving the throttle valve is disposed on the side surface of the throttle body 15a. The throttle body 15a includes an injector 17 configured to supply fuel into an intake passage inside of the throttle body 15a. The fuel tank 9 includes a fuel exhaust port 24a on the upper surface 9c thereof (see FIG. 4). The injector 17 is connected to the fuel exhaust port 24a via a fuel pipe 25 (see FIG. 4). In an example, the fuel tank 9 includes a fuel pump. The fuel in the fuel tank 9 is delivered from the fuel exhaust port 24a as the fuel pump is driven. Further, a purge port 18 configured to release, into the intake passage, the fuel captured by the canister 21 is provided in the throttle body 15a, described in detail below.

A storage case 23 configured to store objects, accessories such as tools, belongings of the rider, and the like, is disposed forward of the air cleaner 10 and the seat 4. According to this layout, a rider is able to access the storage case 23 while remaining seated on the seat 4. The layout of the air cleaner 10 and the storage case 23, however, is not limited to that shown in FIG. 3. For example, the air cleaner 10 may be disposed forward of the seat 4 instead of the storage case 23. In this case, the fuel tank 9 may be disposed below the front portion of the seat 4. Alternatively, the storage case 23 may be disposed behind the fuel tank 9.

As shown in FIGS. 3 and 4, the fuel tank 9 includes the vent 22 configured to discharge fuel vapor and air inside of the tank 9 when the internal pressure thereof increases. The vehicle 1 includes the canister 21 configured to capture fuel vapor discharged from the vent 22. The vehicle 1 further includes the overflow prevention valve 20 disposed in a fuel vapor passage that connects the canister 21 and the vent 22. The vehicle 1 includes a first breather pipe A and a second breather pipe B as the fuel vapor passage connecting the canister 21 and the vent 22. The first breather pipe A connects the vent 22 and the overflow prevention valve 20 while the second breather pipe B connects the overflow prevention valve 20 and the canister 21. Flexible pipe material, for example, a rubber tube, is preferably used as the first breather pipe A and the second breather pipe B.

Sorbent (for example, activated carbon) is filled in the canister 21. When the internal pressure of the fuel tank 9 increases, fuel vapor and air are discharged from the vent 22. The canister 21 temporarily captures the fuel vapor. The canister 21 includes a ventilating hole, and discharges only purified air to the outside air through the ventilating hole. The canister 21 is connected to the intake duct 15. Specifically, the canister 21 is connected to, for example, the purge port 18 (see FIG. 3) of the throttle body 15a provided in the intake duct 15 via a purge pipe C. When the engine 11 is driven and the intake passage comes to have a negative pressure, the fuel captured by the canister 21 is introduced into the intake passage to be supplied to the engine 11.

Figure 6:
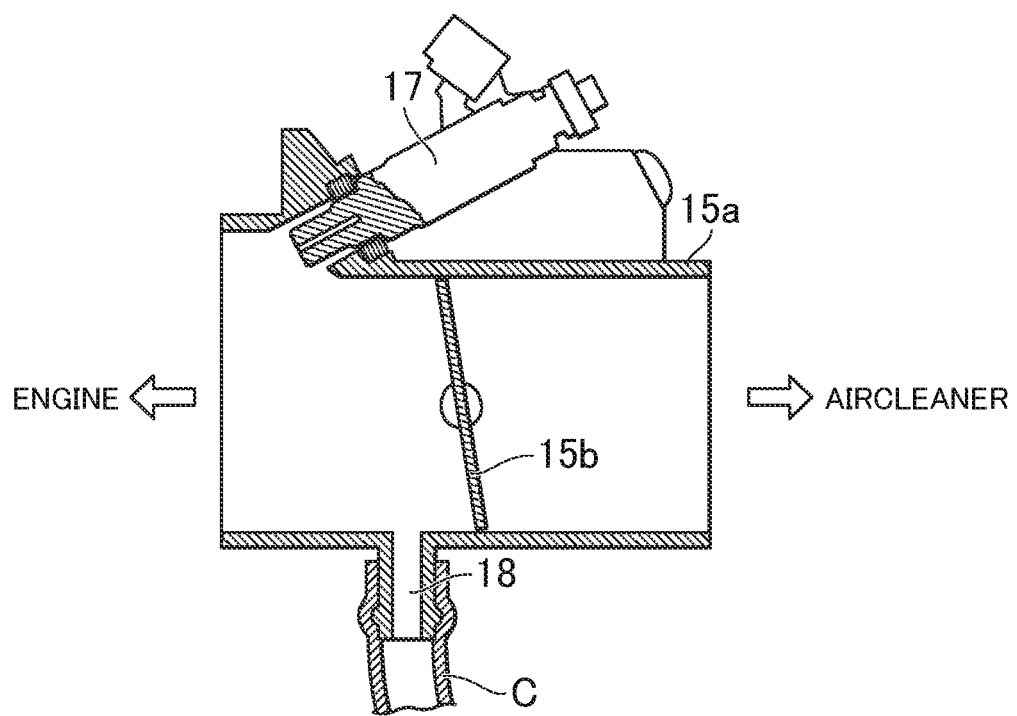
FIG. 6 is a cross-sectional view of a throttle body connected to the engine.

FIG. 6 is a cross-sectional view showing an example of the throttle body 15a. The purge port 18 connects the inside (the intake passage) and the outside of the throttle body 15a. Specifically, the purge port 18 is located downstream of the throttle valve 15b in the intake passage, and is connected to the above described purge pipe C. The purge port 18 may be located on a portion other than the throttle body 15a. For example, the purge port 18 may be located on the intake duct 15 between the throttle body 15a and the inlet hole of the cylinder portion 11a.

The overflow prevention valve 20 is a valve configured to prevent liquid fuel from the vent 22 from flowing into the canister 21 due to a change in the posture of the vehicle 1. When the vehicle body remains in a normal posture (that is, when a straight line extending in the front-back direction of the vehicle body and a straight line extending in the left-right direction are parallel or substantially parallel to the ground surface), the overflow prevention valve 20 remains in an open state, and is switched to a closed state when the vehicle body is inclined by a predetermined angle. An example of the overflow prevention valve 20 is a so-called rollover valve which is switched between an open state and a closed state in accordance with the posture of the valve. The rollover valve includes, inside of the valve, a valving element (for example, a ball) that moves due to a change in the posture of the valve to open/close the valve. The overflow prevention valve 20, however, is not limited to a rollover valve. For example, the overflow prevention valve 20 may be a check valve. Alternatively, a sensor configured to detect a change in the posture of the vehicle body or a sensor configured to detect a presence/absence of liquid fuel in the passage may be provided on the vehicle. In this case, opening/closing of the overflow prevention valve 20 is electronically controlled based on an output from the sensor.

As shown in FIGS. 3 and 4, the vent 22 is provided, for example, on the fuel supply port 7 extending upward from the fuel tank 9. With the above configuration, it is possible to mount the vent 22 in a high position, which prevents the liquid fuel from flowing into the first breather pipe A. As described above, the fuel tank 9 includes the protruding portion 9a protruding beyond the upper frame portion 8a. Specifically, the protruding portion 9a protrudes upward. The fuel supply port 7 extends upward from the upper surface of the protruding portion 9a. With the above configuration, it is possible to effectively prevent liquid fuel from flowing into the first breather pipe A. The fuel supply port 7 includes the cylindrical portion 7a extending upward from the upper surface of the fuel tank 9. Preferably, the vent 22 is provided on one of the members defining the fuel supply port 7, namely, the vent 22 is provided on the cylindrical portion 7a. With the above configuration, it is easy to include the first breather pipe A connected to the vent 22. The vent 22 may be provided on a member other than the fuel supply port 7.

As shown in FIG. 3, the overflow prevention valve 20 is positioned higher than the vent 22 of the fuel tank 9 in a side view of the vehicle body. The height of the overflow prevention valve 20 is defined by the height of the fuel vapor inlet hole of the overflow prevention valve 20. That is, the fuel vapor inlet hole of the overflow prevention valve 20 is positioned higher than the vent 22 (the inlet hole may be provided on the lower end portion of the overflow prevention valve 20 or on the upper end portion of the overflow prevention valve 20). With the above configuration, it is possible to reduce the amount of liquid fuel reaching the overflow prevention valve 20. Further, it is possible to have the liquid fuel in the first breather pipe A return to the fuel tank 9 when the vehicle body returns from an inclined posture to a normal posture. In a vehicle in which the fuel tank is disposed forward of the seat and disposed above the engine, for example, options for the layout of the overflow prevention valve is reduced because the fuel tank is positioned high on the vehicle body. In the vehicle 1, on the other hand, because the fuel tank 9 in the vehicle 1 is disposed below the seat 4, as described above, the fuel tank 9 is relatively positioned lower and it is resultantly possible to increase the options for the layout of the overflow prevention valve 20. The overflow prevention valve 20 is positioned higher than the upper surface 9c of the fuel tank 9 in a side view of the vehicle body.

In the present preferred embodiment, the overflow prevention valve 20 is positioned lower than the upper surface of the seat 4. In an example, as shown in FIG. 3, the overflow prevention valve 20 is disposed below the seat 4 and covered by the seat 4. With the above configuration, it is possible to prevent a rider from unintentionally touching the overflow prevention valve 20. Preferably, the overflow prevention valve 20 is positioned between the left and right seat lateral portions 4b (that is, the overflow prevention valve 20 is positioned higher than the lower edge of the seat lateral portion 4b). With the above configuration, the overflow prevention valve 20 is positioned higher compared to a case in which the overflow prevention valve 20 is positioned lower than the seat lateral portion 4b. The position of the overflow prevention valve 20, however, is not limited to the above described preferred embodiment. For example, the overflow prevention valve 20 may not be covered by the seat 4.

The overflow prevention valve 20 is attached to a member positioned higher than the fuel tank 9. With the above configuration, it is easier to mount the overflow prevention valve 20 in a higher position compared to a case in which the overflow prevention valve 20 is attached to the fuel tank 9, for example. The vehicle 1 includes the exterior cover 6 covering the fuel tank 9, and the exterior cover 6 includes a cover middle portion 6b covering the fuel tank 9 and disposed below the seat 4. For example, the overflow prevention valve 20 is attached to the cover middle portion 6b, as shown in FIG. 5. Because the cover middle portion 6b is positioned above the vehicle body frame 8 (specifically, the upper frame portion 8a), it is easier to mount the overflow prevention valve 20 in a higher position compared to a case in which the overflow prevention valve 20 is supported by the vehicle body frame 8. Further, because the cover middle portion 6b of the exterior cover 6 extends from the fender portion 6a on the right side to the fender portion 6a on the left side, attaching the overflow prevention valve 20 to the cover middle portion 6b increases the options to locate the position of the overflow prevention valve 20.

As shown in FIG. 5, an opening is provided on the cover middle portion 6b, and the overflow prevention valve 20 is exposed upward in the opening. According to such a structure of the overflow prevention valve 20 and the cover middle portion 6b, it is easy to mount the overflow prevention valve 20 in a high position. The overflow prevention valve 20 is fixed to an edge of the opening of the cover middle portion 6b, using a bolt, for example. The second breather pipe B is connected to the upper portion of the overflow prevention valve 20, for example, as shown in FIG. 5, and extends to the canister 21 through the opening in the cover middle portion 6b. The first breather pipe A is located below the cover middle portion 6b and is connected to the lower end portion of the overflow prevention valve 20, for example. The attachment structure of the overflow prevention valve 20, however, is not limited to the above described configuration. For example, the overflow prevention valve 20 may be attached to the vehicle frame 8 or on the upper portion of the fuel tank 9.

The upper surface of the seat 4 is inclined so as to become gradually higher toward the rear. Further, the thickness of the seat upper portion 4a of the seat 4 (the thickness of the cushion) becomes gradually thinner toward the rear. Thus, the lower surface of the seat upper portion 4a becomes gradually higher toward the rear. As shown in FIG. 4, the position of the overflow prevention valve 20 is preferably shifted rearward relative to the fuel tank 9. That is, the overflow prevention valve 20 is preferably positioned farther rearward than the center C2 of the fuel tank 9 in the front-back direction. Because the lower surface of the seat upper portion 4*a* becomes gradually higher toward the rear, it is easy to mount the overflow prevention valve 20 in a high position by disposing the overflow prevention valve 20 farther rearward than the center C2 of the fuel tank 9. As shown in FIG. 4, the overflow prevention valve 20 is positioned farther rearward than the fuel exhaust port 24*a* and the fuel supply port 7, for example. The position of the overflow prevention valve 20, however, is not limited to the above described configuration. For example, the overflow prevention valve 20 may be positioned farther forward than the center C2. The overflow prevention valve 20 may be positioned farther forward than the fuel exhaust port 24*a* and the fuel supply port 7.

As shown in FIGS. 3 and 4, in an example, the position of the overflow prevention valve 20 in the left-right direction of the vehicle body is closer to the center of the vehicle body in the left-right direction than the right end of the fuel tank 9 and the left end of the fuel tank 9. That is, the position of the overflow prevention valve 20 in the left-right direction preferably is set within a range G corresponding to the width of the fuel tank 9 in the left-right direction. According to this layout of the overflow prevention valve 20, it is possible to achieve a compact layout of the first breather pipe A connecting the vent 22 in the fuel supply port 7 and the overflow prevention valve 20.

In an example, the overflow prevention valve 20 is preferably positioned farther rearward than the front end E of the fuel tank 9. Further, the overflow prevention valve 20 is preferably positioned farther forward than the rear end F of the fuel tank 9. That is, as shown in FIGS. 3 and 4, the position of the overflow prevention valve 20 in the front-back direction of the vehicle body is preferably farther rearward than the front end E of the fuel tank 9 and farther forward than the rear end F of the fuel tank 9. In other words, the position of the overflow prevention valve 20 in the front-back direction may be within a range D corresponding to the width of the fuel tank 9 in the front-back direction. According to this layout of the overflow prevention valve 20, it is possible to arrange a more compact layout of the first breather pipe A. In FIG. 4, the overflow prevention valve 20 is preferably positioned overlapping the fuel tank 9 in a plan view of the vehicle body. The fuel tank 9 includes a tank cover 9*e* covering the right side portion of the tank. In an example, the rear end F of the fuel tank 9 coincides with the rear end of the tank cover 9*e*. That is, the overflow prevention valve 20 in FIG. 4 is positioned farther forward than the rear end F of the tank cover 9*e*. However, the fuel tank 9 may not include such a tank cover 9*e*.

The position of the overflow prevention valve 20 is not limited to the above described configuration. For example, the overflow prevention valve 20 may be positioned farther forward than the front end E of the fuel tank 9. In this case, the overflow prevention valve 20 may be positioned, for example, between the fuel tank 9 and the air cleaner 10 or farther forward than the air cleaner 10. Alternatively, the overflow prevention valve 20 may be positioned farther rearward than the rear end F of the fuel tank 9.

Preferably, the overflow prevention valve 20 is disposed on the side opposite from the muffler 26*a* across the center line C1. With the above configuration, it is easy to ensure a sufficient distance between a passage extending from the vent 22 to the purge port 18 and the muffler 26*a*. The muffler 26*a* in FIG. 4 is disposed to the left of the center line C1. Thus, the overflow prevention valve 20 is disposed to the right of the center line C1. Preferably, the canister 21 is disposed on the side opposite from the muffler 26*a* across the center line C1. With the above configuration, it is much easier to ensure a sufficient distance between the passage extending from the vent 22 to the purge port 18 and the muffler 26*a*. More preferably, not only the overflow prevention valve 20 but also all members disposed in the passage extending from the vent 22 to the purge port 18 (specifically, the first breather pipe A, the overflow prevention valve 20, the second breather pipe B, the canister 21, and the purge pipe C) are disposed on the side opposite from the muffler 26*a* across the center line C1. In a case in which the exhaust system 26 is disposed to the right of the center line C1, the members disposed in the passage extending from the vent 22 to the purge port 18 are preferably disposed to the left of the center line C1.

As described above, the fuel tank 9 largely protrudes toward the side opposite from the muffler 26*a*. That is, the fuel tank 9 includes a protruding portion 9*a* on the side opposite from the muffler 26*a*. Thus, the center of the fuel tank 9 in the left-right direction is positioned on the same side as the overflow prevention valve 20 relative to the center line C1 of the vehicle body in the left-right direction. That is, the center of the overflow prevention valve 20 and the fuel tank 9 in the left-right direction is positioned to the right of the center line C1 of the vehicle body.

As shown in FIG. 4, the first breather pipe A is preferably bent back and forth a plurality of times in the passage extending from the vent 22 to the overflow prevention valve 20. That is, the first breather pipe A may include a plurality of bent portions at which an extending direction of the first breather pipe A is reversed. This allows the first breather pipe A to have a longer length. As a result, it is possible to prevent any liquid fuel in the first breather pipe A from reaching the overflow prevention valve 20. However, the first breather pipe A does not necessarily have such bent portions in which the extending direction is reversed.

As shown in FIG. 3, the overflow prevention valve 20 may be positioned highest among the vent 22, the purge port 18, the canister 21, and the pipes A, B, C connecting these elements. With the above configuration, any liquid fuel that has flowed into the first breather pipe A likely returns to the vent 22. Further, the overflow prevention valve 20 may be positioned highest among the fuel exhaust port 24*a* of the fuel tank 9, the fuel pipe 25, and the injector 17. That is, the overflow prevention valve 20 may be positioned highest in the fuel system in which the fuel (including liquid fuel and fuel vapor) coming out from the fuel tank 9 flows. Note that a fuel system includes the injector 17, a passage connecting the fuel tank 9 and the injector 17, the canister 21, the purge port 18, and the pipes A, B, C connecting these elements.

As described above, the overflow prevention valve 20 is preferably positioned farther rearward than the center C2 of the fuel tank 9. Meanwhile, the canister 21 is preferably positioned farther forward than the center C2 of the fuel tank 9. In this preferred embodiment, the canister 21 is positioned farther forward than the fuel tank 9. With the above configuration, it is possible to ensure a shorter distance between the purge port 18 and the canister 21. As a result, it is possible to prevent the purge pipe C connecting the purge port 18 and the canister 21 from sagging in the middle to thus prevent liquid fuel from staying in the purse pipe C.

As described above, in the present preferred embodiment, the air cleaner 10 is preferably disposed forward of the fuel tank 9. The canister 21 is preferably disposed between the air cleaner 10 and the fuel tank 9 in a side view of the vehicle body. In FIG. 3, the air cleaner 10 is disposed such that the rear surface 10d thereof extends diagonally downward and forward. This arrangement of the air cleaner 10 creates, between the rear surface 10d of the air cleaner 10 and the front surface of the fuel tank 9, a space which becomes gradually larger toward the bottom. The canister 21 is disposed in the space created between the air cleaner 10 and the fuel tank 9. According to this layout, the space between the air cleaner 10 and the fuel tank 9 is effectively utilized, and thus the fuel tank 9, the air cleaner 10, and the canister 21 are compactly arranged. In the present preferred embodiment, the air cleaner 10 is preferably disposed diagonally such that a space between the rear surface 10d of the air cleaner 10 and the front surface of the fuel tank 9 becomes gradually larger toward the bottom. That is, the air cleaner 10 is disposed diagonally such that the front surface thereof is directed forward and upward.

The canister 21 is preferably positioned below the rear surface of the air cleaner 10 and covered by the air cleaner 10 in a plan view. With the above configuration, the canister 21 and the air cleaner 10 are compactly arranged. Further, the canister 21 is mounted in a low position. As a result, even when liquid fuel is generated in the purge pipe C due to condensation (devolatilization) of fuel vapor, it is possible to prevent the liquid fuel from staying in the purge pipe C. As shown in FIG. 3, in an example, the canister 21 is disposed such that the upper end thereof is positioned lower than the upper surface 9c of the fuel tank 9 and the upper surface 10c of the air cleaner 10. Further, in an example, the canister 21 is disposed such that the lower portion thereof is positioned lower than the lower surface of the fuel tank 9 and the lower end of the air cleaner 10.

The canister 21 is a thin member (preferably a cylindrical member) that is elongated in one direction (the one direction will be hereinafter referred to as a length direction). The canister 21 is disposed such that the length direction thereof extends along the up-down direction. However, the canister 21 may be disposed such that the length direction thereof extends along the left-right direction of the vehicle body.

As shown in FIG. 3, the canister 21 is disposed in a position higher than the deceleration device 13. That is, the position of the center C3 of the canister 21 in the up-down direction is higher than the deceleration device 13. The canister 21 is positioned farther forward than the deceleration device 13. The canister 21 is positioned farther rearward and higher than the case 11e of the engine 11. That is, the center C3 of the canister 21 in the up-down direction is higher than the center C5 of the case 11e in the up-down direction. With the above configuration, it is possible to prevent the canister 21 from being hit by stones or the like kicked up from a ground surface by the case 11e and the deceleration device 13 which are disposed below the canister 21. The position of the canister 21, however, is not limited to the above described configuration. For example, the center C3 of the canister 21 may be positioned lower than the center C5 of the case 11e.

The canister 21 is disposed in the lowest portion of the passage extending from the vent 22 to the purge port 18. That is, the canister 21 is positioned lower than the vent 22, the first breather pipe A, the overflow prevention valve 20, the second breather pipe B, the purge pipe C, and the purge port 18. According to this layout, even when fuel vapor is liquidized through condensation of fuel vapor in the second breather pipe B and the purge pipe C, the liquid fuel flows toward the canister 21. As a result, it is possible to prevent the liquid fuel from staying in the pipes B and C.

As shown in FIG. 3, preferably, the second breather pipe B monotonically descends from the overflow prevention valve 20 to the canister 21. Meanwhile, preferably, the purge pipe C monotonically ascends from the canister 21 to the purge port 18. With the above configurations, liquid fuel resulting from condensation of fuel vapor or the like monotonically descends in the second breather pipe B and the purge pipe C to flow into the canister 21. Similar to the pipes A and B, a flexible pipe material, for example, a rubber tube is used as the purge pipe C. The purge pipe C may include a valve to control the flow of fuel vapor.

As shown in FIG. 4, the canister 21 is positioned, for example, farther leftward than the right end of the fuel tank 9 and farther rightward than the left end of the fuel tank 9. That is, the position of the canister 21 in the left-right direction is within a range G corresponding to the width of the fuel tank 9 in the left-right direction. Further, the canister 21 is positioned farther leftward than the right side surface of the air cleaner 10, and farther rightward than the left side surface of the air cleaner 10. According to this layout of the canister 21, the space between the fuel tank 9 and the air cleaner 10 is effectively utilized. The canister 21 is supported by the vehicle frame 8, for example. As shown in FIG. 3, for example, the canister 21 is attached to the cross member 8e fixed on the arm support portion 8f that supports the rear wheel 3 via an arm. A member that supports the canister 21 is not limited to the vehicle frame 8. The canister 21 may be attached to the outer surface of the fuel tank 9 or the case 11e of the engine 11.

As described above, the purge port 18 is provided on the throttle body 15a. In an example of the throttle body 15a, as shown in FIG. 6, the injector 17 is disposed on the upper side of the throttle body 15a. In this case, preferably, the purge port 18 is provided on the lower side of the throttle body 15a. That is, the purge port 18 is provided on the side opposite from the injector 17 across the intake passage of the throttle body 15a. With the above configuration, it is possible to prevent interference between the injector 17 and the purge pipe C. In the case where the injector 17 is disposed on the lower side of the throttle body 15a, the purge port 18 is preferably provided on the upper side of the throttle body 15a.

The intake duct 15 diagonally extends rearward and upward from the inlet hole of the cylinder portion 11a. Thereafter, the intake duct 15 is bent to extend diagonally rearward and downward. The throttle body 15a is preferably disposed on a portion that extends diagonally rearward and upward from the inlet hole. Thus, the throttle body 15a is positioned higher compared to a case in which the intake duct 15 extends, for example, in the horizontal direction. This makes it easy to arrange the purge pipe C to monotonically ascend.

Figure 7:
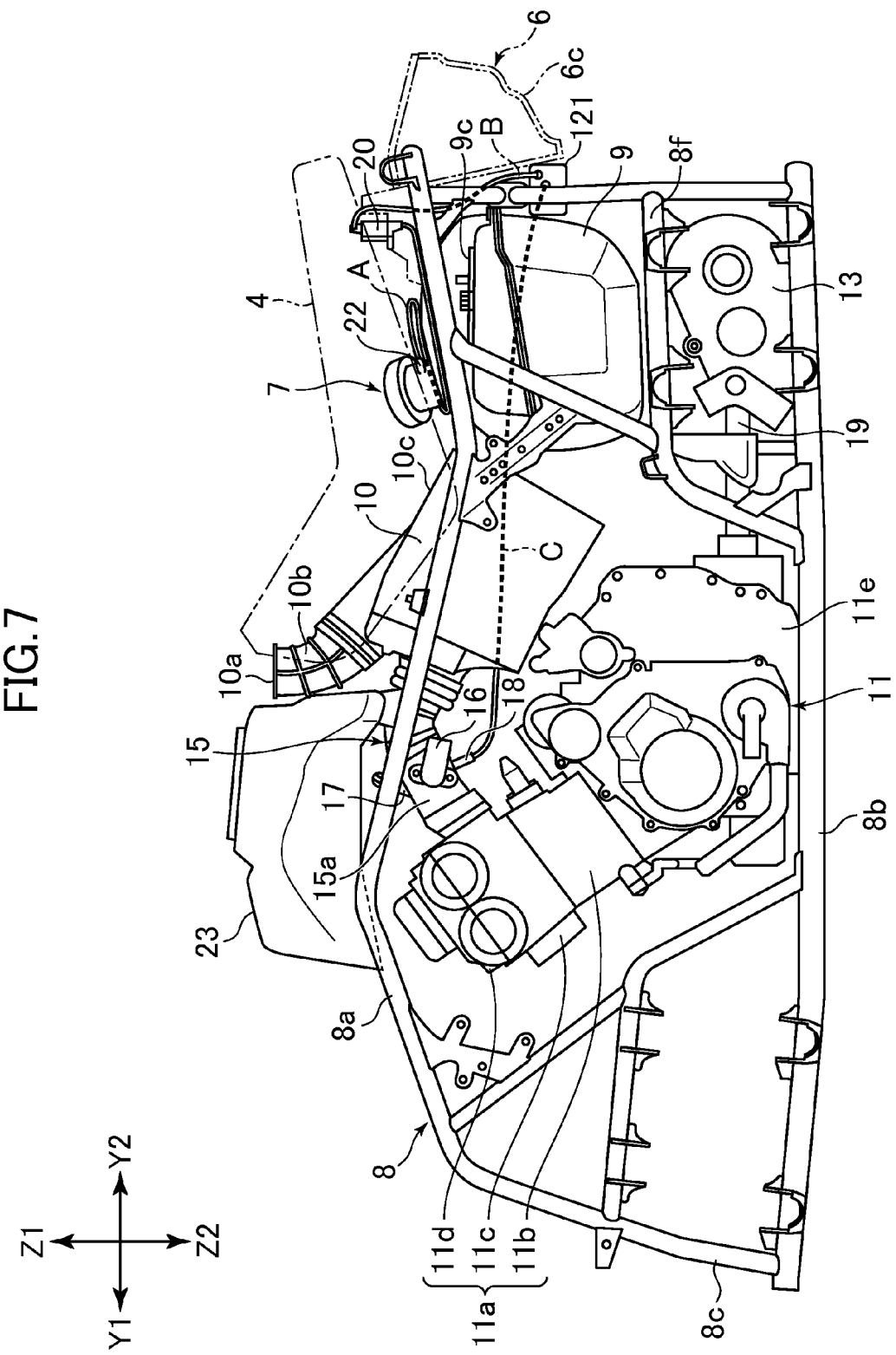
FIG. 7 is a side view showing a modified example of the position of the canister.

In the preferred embodiments described above, the canister 21 is preferably disposed between the fuel tank 9 and the air cleaner 10 in a side view of the vehicle body. However, the position of the canister 21 is not limited to the above described preferred embodiments. For example, the canister 21 may be disposed behind the fuel tank 9. FIG. 7 is a side view showing a canister 121 in the above described preferred embodiment. In this diagram, the engine 11, the fuel tank 9, and the air cleaner 10, and the like, are shown adjacent to the canister 121, similar to FIG. 3. In FIG. 7, a member described in the above preferred embodiment is provided with the same reference numeral. In the following, differences from the preferred embodiments described so far with reference to FIGS. 1 to 6 will be mainly described.

Members and structures not described here are similar to those described with reference to FIGS. 1 to 6.

In the preferred embodiment shown in FIG. 7, the canister 121 is disposed behind the fuel tank 9 and covered by the exterior cover 6. Thus, the canister 121 is not exposed on the outside appearance of the vehicle. The canister 121 is disposed such that, for example, the length direction thereof is oriented along the left-right direction. However, the posture of the canister 121 is not limited to the above described configuration. For example, the canister 121 may be disposed such that the length direction thereof is oriented along the up-down direction of the vehicle body. The canister 121 is positioned farther leftward than the right end of the fuel tank 9 and farther rightward than the left end of the fuel tank 9. The canister 121 is disposed in a position lower than the upper surface 9c of the fuel tank 9 and higher than the lower surface of the fuel tank 9.

Similar to the canister 21, the canister 121 is disposed in the lowest portion of the passage extending from the vent 22 to the purge port 18 of the throttle body 15a. That is, the canister 121 is positioned lower than the vent 22, the first breather pipe A, the overflow prevention valve 20, the second breather pipe B, the purge pipe C, and the purge port 18. Preferably, the second breather pipe B monotonically descends from the overflow prevention valve 20 to the canister 121. Preferably, the purge pipe C monotonically ascends from the canister 121 to the purge port 18.

As shown in FIG. 7, the exterior cover 6 may include, in the rearmost portion of the exterior cover 6, a storage portion 6c configured to store objects, including an accessories such as tools, belongs of the rider, and the like, disposed in the rearmost portion thereof. In this case, the canister 121 is disposed in the space between the fuel tank 9 and the storage unit 6c.

The above described specific structures are only examples, and the present invention described in this specification is not limited to these specific structures. A person skilled in the art may make various modifications to the preferred embodiments described, including desirable modifications to the respective members, and the shape, number, position, and the like of the these members, and it should be understood that the technical scope of the present invention described in this specification includes such modifications as well.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A saddle-riding type vehicle comprising:
   a seat;
   a steering handle disposed forward of the seat;
   a fuel tank including a vent configured to discharge fuel vapor, the fuel tank being arranged such that at least a portion of the fuel tank is positioned below the seat;
   a canister connected to the vent of the fuel tank and configured to capture the fuel vapor; and
   an overflow prevention valve provided in a fuel vapor passage that connects the vent and the canister, the overflow prevention valve being configured to prevent liquid fuel from flowing from the fuel tank to the canister, and the overflow prevention valve being positioned higher than the vent of the fuel tank.

2. The saddle-riding type vehicle according to claim 1, wherein the overflow prevention valve is positioned higher than the canister.

3. The saddle-riding type vehicle according to claim 1, further comprising:
   an intake passage connected to an engine;
   a purge port in the intake passage; and
   a purge pipe connecting the purge port and the canister; wherein
   the overflow prevention valve is positioned in a highest portion of a passage extending from the vent to the purge port.

4. The saddle-riding type vehicle according to claim 1, wherein the overflow prevention valve is positioned lower than an upper surface of the seat.

5. The saddle-riding type vehicle according to claim 1, further comprising an exterior cover covering the fuel tank, wherein the overflow prevention valve is attached to the exterior cover.

6. The saddle-riding type vehicle according to claim 1, wherein the overflow prevention valve is positioned farther leftward than a right end of the fuel tank and farther rightward than a left end of the fuel tank.

7. The saddle-riding type vehicle according to claim 1, wherein the overflow prevention valve is positioned farther rearward than a front end of the fuel tank and farther forward than a rear end of the fuel tank.

8. The saddle-riding type vehicle according to claim 1, wherein the overflow prevention valve is located in a position overlapping the fuel tank in a plan view of the saddle-riding type vehicle.

9. The saddle-riding type vehicle according to claim 1, wherein the overflow prevention valve is disposed on either one of a right side and a left side of a center of a vehicle body in a left-right direction of the saddle-riding type vehicle.

10. The saddle-riding type vehicle according to claim 9, wherein a center of the fuel tank in the left-right direction is positioned on a side same as the overflow prevention valve relative to the center of the vehicle body in the left-right direction.

11. The saddle-riding type vehicle according to claim 9, wherein the canister and a pipe defining the fuel vapor passage are positioned on a side same as the overflow prevention valve relative to the center of the vehicle body in the left-right direction.

12. The saddle-riding type vehicle according to claim 1, further comprising:
   a first breather pipe connecting the vent and the overflow prevention valve and defining a portion of the fuel vapor passage;
   a second breather pipe connecting the overflow prevention valve and the canister and defining a portion of the fuel vapor passage; and
   a purge pipe connecting the canister and an intake passage connected to an engine; wherein
   the canister is positioned lower than the overflow prevention valve, the first breather pipe, the second breather pipe, and the purge pipe.

13. The saddle-riding type vehicle according to claim 1, further comprising an air cleaner disposed forward of the fuel tank, wherein the canister is positioned between the fuel tank and the air cleaner.

14. The saddle-riding type vehicle according to claim 13, wherein the canister is positioned higher than a case housing a transmission in a side view of the saddle-riding type vehicle, and the transmission is positioned in a rear portion of an engine.

15. The saddle-riding type vehicle according to claim 1, wherein the second breather pipe connecting the overflow prevention valve and the canister monotonically descends from the overflow prevention valve toward the canister.

16. The saddle-riding type vehicle according to claim 1, further comprising a purge pipe connecting the canister and an intake passage connected to an engine, wherein the intake passage includes a purge port to which the purge pipe is connected.

17. The saddle-riding type vehicle according to claim 1, further comprising a first breather pipe connecting the vent and the overflow prevention valve, wherein the first breather pipe includes a plurality of bent portions at which a direction in which the first breather pipe extends is reversed.

18. The saddle-riding type vehicle according to claim 1, wherein the canister is disposed behind the fuel tank.

19. The saddle-riding type vehicle according to claim 18, further comprising a storage unit provided behind the fuel tank, wherein the canister is positioned between the fuel tank and the storage unit.

* * * * *